(12) United States Patent
Dautelle

(10) Patent No.: US 7,236,165 B2
(45) Date of Patent: Jun. 26, 2007

(54) SYSTEM AND METHOD FOR ASYNCHRONOUS STORAGE AND PLAYBACK OF A SYSTEM STATE

(75) Inventor: Jean-Marie R. Dautelle, Marlboro, MA (US)

(73) Assignee: Raytheon Company, Waltham, MA (US)

(*) Notice: Subject to any disclaimer, the term of this patent is extended or adjusted under 35 U.S.C. 154(b) by 118 days.

(21) Appl. No.: 10/617,603

(22) Filed: Jul. 11, 2003

(65) Prior Publication Data

US 2004/0015740 A1 Jan. 22, 2004

Related U.S. Application Data

(60) Provisional application No. 60/395,643, filed on Jul. 12, 2002, provisional application No. 60/395,236, filed on Jul. 11, 2002.

(51) Int. Cl.
*G06F 17/00* (2006.01)
*G06F 5/00* (2006.01)
*G06K 9/36* (2006.01)
*G06K 9/46* (2006.01)

(52) U.S. Cl. ............... 345/418; 710/65; 710/68; 382/232; 382/239; 382/276; 382/284; 712/220; 712/227

(58) Field of Classification Search .......... 710/62, 710/65, 68, 74; 382/232, 284, 239, 254, 382/276; 345/418, 156; 712/220, 227
See application file for complete search history.

(56) References Cited

U.S. PATENT DOCUMENTS

| 5,513,316 | A | | 4/1996 | Rodrigues et al. |
| 5,649,032 | A | * | 7/1997 | Burt et al. ............... 382/284 |
| 5,717,879 | A | | 2/1998 | Moran et al. |
| 5,893,053 | A | | 4/1999 | Trueblood |
| 5,943,445 | A | * | 8/1999 | Dufaux ............... 382/236 |
| 6,205,260 | B1 | * | 3/2001 | Crinon et al. ............... 382/284 |
| 6,272,568 | B1 | * | 8/2001 | Ishihara ............... 710/68 |
| 2002/0063713 | A1 | | 5/2002 | Sowizral et al. |

(Continued)

FOREIGN PATENT DOCUMENTS

EP 0 694 881 1/1996

(Continued)

OTHER PUBLICATIONS

Cunningham et al.; "Lessons from Scene Graphs: Using Scene Graphs to Teach Heirarchial Modelling;" internet article from www.cs.csustan.edu/nrsc/nsf/scenegraphg/pdf; 13 pages.

(Continued)

*Primary Examiner*—Tanh Q. Nguyen
(74) *Attorney, Agent, or Firm*—Daly, Crowley, Mofford & Durkee, LLP

(57) ABSTRACT

A system and method for asynchronous storage and playback of system data provides asynchronously recording of a set of data as a dynamic snapshot at a predetermined time, and periodically recording, at a predetermined time interval, additional system commands which represent changes to the set of data recorded at the predetermined time. The system and method also provide asynchronous playback associated with a time of interest by retrieving a dynamic snapshot associated with a time prior to the time of interest and also retrieving the additional system commands to move the retrieved dynamic snapshot forward in time to the time of interest.

29 Claims, 7 Drawing Sheets

U.S. PATENT DOCUMENTS

2003/0222883 A1* 12/2003 Deniau et al. .............. 345/582

FOREIGN PATENT DOCUMENTS

WO          WO 00/68840          11/2000

OTHER PUBLICATIONS

RM Scene Graph Product Overview; internet article from http://www.r3vis.com/RMSSceneGraph/overviewinfo.html; two pages.

Baker; "SSG: A Simple Scene Graph APO for OpenGL;" internet article from http://plib/sourceforge.net/ssg/; three pages.

Dautelle; "Asynchronous Recording of Real-Time Systems;" Raytheon Cmpany 2002; 2nd Systems/Software Engineering Symposium, Apr. 8-10, 2003; six pages.

Dautelle; "Asynchronous Recording of Real-Time Systems;" Raytheon Cmpany 2002; 2nd Systems/Software Engineering Symposium, Apr. 8-10, 2003; MicroSoft PowerPoint presentation, pp. 1-13.

"Scene Description and Management: The Scene Graph;" Chapter 1: internet article from http://www.csc.calpoly.edu/~hitchner/CS471.W2003/SceneGraph.pdf; 28 pages.

Crowley; "TkReplay: Record and Replay in Tk;" Third Annual Tcl/Tk Workshop; Toronto, Canada; Jul. 1995; (10 pages).

PCT Search Report; PCT/US2003/21813 dated Apr. 8, 2005.

PCT Search Report; PCT/US2003/21812 dated Oct. 20, 2004.

* cited by examiner

SYSTEM AND METHOD FOR ASYNCHRONOUS STORAGE AND PLAYBACK OF A SYSTEM STATE

CROSS-REFERENCE TO RELATED APPLICATIONS

This application claims the benefit under 35 U.S.C. §119(e) of U.S. Provisional Application No. 60/395,236 filed Jul. 11, 2002 and U.S. Provisional Application No. 60/395,643 filed Jul. 12, 2002, which applications are hereby incorporated herein by reference in their entirety.

STATEMENTS REGARDING FEDERALLY SPONSORED RESEARCH

Not applicable.

FIELD OF THE INVENTION

This invention relates generally to computer systems, such as air traffic control systems, and, more particularly, to a system and method for storing and playing back a state of a computer system.

BACKGROUND OF THE INVENTION

As is known in the art, air traffic control (ATC) is a service that promotes the safe, orderly, and expeditious flow of air traffic. Safety is principally a matter of preventing collisions with other aircraft, obstructions, and the ground, assisting aircraft in avoiding hazardous weather, assuring that aircraft do not operate in an airplane where operations are prohibited, and assisting aircraft in distress. Orderly and expeditious flow assures the efficiency of aircraft operations along the routes selected by the operator.

As is also known, air traffic control services are provided by air traffic control (ATC) systems. An air traffic control system is a type of computer and display system that processes data received from air surveillance radar systems for the detection and tracking of aircraft. Air traffic control systems are used for both civilian and military applications to determine the identity and locations of aircraft in a particular geographic area.

It is desirable in aircraft control systems to store data recorded, obtained, or otherwise provided by, the air traffic control system. In particular, it is desirable to be able to store and play back display data, including images shown on the display system of the air traffic control system. It is desirable to be able to record and play back air traffic control data in case of accident, for teaching purposes, for simulation purposes and the like.

Conventionally, there are several ways to record ATC display data. One technique is to use a video recorder to store ATC display data at each ATC display station. While this approach does not interrupt system operation (i.e., it has no impact on computer code or system performance and thus is a transparent recording technique), the video recorder approach has several drawbacks. For example, there is a relatively large amount of display data to store. If videotapes are used for storage, a relatively large number of videotapes are required to store all of the necessary display data associated with a period of time (e.g., 24 hours). Also, there are typically multiple ATC stations/terminals at which storage is desired. Thus, multiple video recorders or other recording devices are required. Furthermore, it is relatively time consuming to locate a specific location on a videotape during playback of the display data.

Another technique for transparently storing data is to provide computer code used in ATC systems having instructions for sending messages to a storage device, which identify to the storage device the operations being performed by the ATC system. The messages can be sent to the storage device either before or after a corresponding operation is performed. To playback what has occurred in the ATC system, the storage device sends the stored messages to the ATC system and the ATC display system carries out the messages.

However, if the developer of the computer code fails to include code to store a certain step or operation, or if the developer fails to include code to playback a certain message, then the record or playback will not be accurate. Another problem with this approach is that it is necessary to process a relatively large amount of data. Also, it is very expensive in terms of code development because it is very time consuming to include all of the additional computer code to store and play back the operations being displayed on the display system.

It would, therefore, be desirable to overcome the aforesaid and other disadvantages.

SUMMARY OF THE INVENTION

A system for asynchronous storage and playback of a system state provides "instantaneous images" of a system without interfering with the system behavior and response time. The images are associated with an ordered set of commands referred herein as a "dynamic snapshot." When stored and later executed in the proper order, the dynamic snapshot commands set the system to a snapshot state, which is representative of a time at which the dynamic snapshot was recorded.

In one particular embodiment, the system for asynchronous storage and playback of a system state includes a storage device for storing at certain times an image or "snapshot" of an air traffic control (ATC) display. The system can also store changes that occur on the display between the snapshots. With this particular arrangement, a system for transparently storing the ATC display is provided that does not interfere with other processing performed by the ATC system. By storing the display at certain times (i.e. storing the display snapshot), and then recording the changes on the display which occur between the certain times, the system records a reduced amount of data than is recorded in prior art approaches, without a decrease in the accuracy of the recording. While the system is described in association with an ATC display, it should be recognized that the system is applicable to any system having software commands or instructions.

In accordance with the present invention, a method of storing commands includes recording a first set of commands to a command queue as a first dynamic snapshot and storing the first dynamic snapshot. The method also includes recording one or more additional sets of commands to the command queue and eliminating overridden commands from the command queue to provide a second dynamic snapshot. The second dynamic snapshot is stored. In one embodiment, the commands are display commands associated with an ATC display.

In accordance with another aspect of the present invention, stored commands associated with a time of interest are played back by receiving the time of interest and retrieving a stored dynamic snapshot corresponding to a time at, or prior to, the time of interest. Additional sets of stored commands are also retrieved and appended to the dynamic snapshot to provide an intermediate dynamic snapshot. The intermediate dynamic snapshot is interpreted. In one particular embodiment, the stored dynamic snapshot includes display commands associated with an air traffic control (ATC) display and the interpreting results in a view of the ATC display corresponding to the time of interest. In one particular embodiment overridden commands within the intermediate dynamic snapshot are eliminated.

In accordance with another aspect of the present invention, a computer program medium for storing commands includes instructions for recording a first set of commands to a command queue as a first dynamic snapshot and instructions for storing the first dynamic snapshot. The computer program medium also includes instructions for recording one or more additional sets of commands to the command queue and instructions for eliminating overridden commands from the command queue to provide a second dynamic snapshot. The computer program medium also includes instructions for storing the second dynamic snapshot. In one embodiment, the commands are display commands associated with an ATC display.

In accordance with another aspect of the present invention, a computer program medium for storing commands includes instructions for receiving a time of interest and instructions for retrieving a stored dynamic snapshot corresponding to a time at, or prior to, the time of interest. The computer program medium also includes instructions for retrieving additional sets of stored commands and instructions for appending the additional sets of stored commands to the dynamic snapshot to provide an intermediate dynamic snapshot. The computer program medium also includes instructions for interpreting the intermediate dynamic snapshot. In one particular embodiment, the stored dynamic snapshot includes display commands associated with an air traffic control (ATC) display and the commands for interpreting result in a view of the ATC display corresponding to the time of interest. In one particular embodiment, the computer program medium includes instructions for eliminating overridden commands from within the intermediate dynamic snapshot.

In accordance with another aspect of the present invention, a system includes a recording proxy, a dynamic snapshot generator, a command interface, and a storage device, all coupled so as to store dynamic snapshots and additional display commands in the storage device.

With this invention, the dynamic snapshot can be recorded and stored without interrupting real-time system operation. In one embodiment, this approach allows a display image to be stored without an impact on the user, i.e., without freezing a real-time display and also without burdening a computer code developer by requiring the developer to write additional computer code to record and/or store system commands. The present invention allows the asynchronous storage and playback of a stored system state (snapshot) without impacting system real-time operation.

The present invention finds application in display recorders (e.g., of the type used in air traffic control systems) as well as in systems (e.g., database systems) in which it is desirable to be able to rapidly recreate a data set without interfering with real-time system behavior (e.g., response time).

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
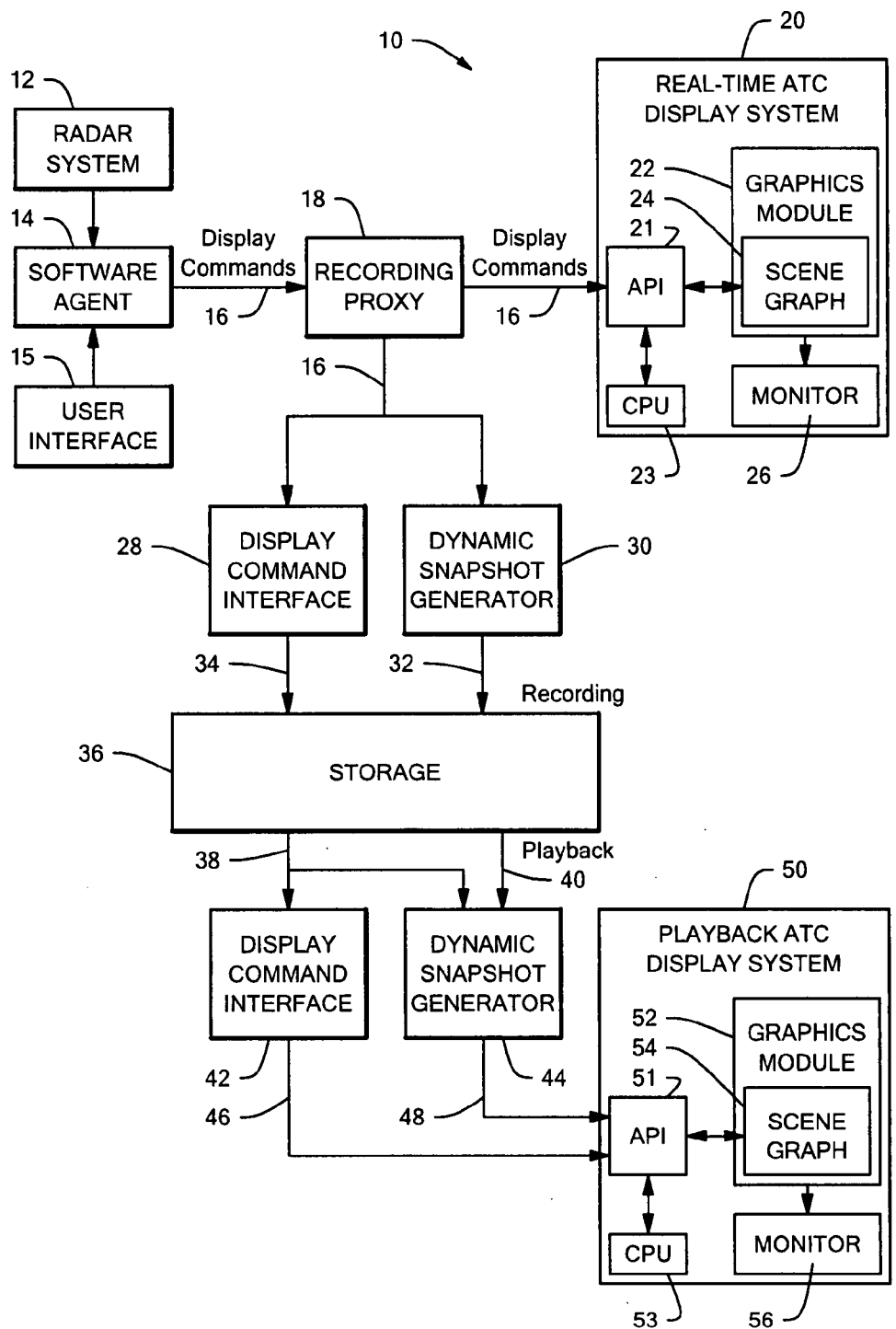
FIG. 1 is a block diagram of an air traffic control (ATC) recording system, which utilizes a dynamic snapshot and has store and playback capability.

Before describing a system and method for asynchronous storage of a system snapshot, some introductory terms are described. As used herein, the terms "data storage" and "recording" are used synonymously to refer to retention of data. However, as used herein, the term "storage" can, in some embodiments, refer to retention of data for a particularly long period of time, for example, hours or days.

A scene graph will be understood to be a particular representation containing information about the geometry and appearance of objects appearing on a graphical display. The scene graph is a dynamic data structure within a computer program that can also be saved as a file. The scene graph includes data that describes shape objects (geometry and appearance), geometric structure relationships (geometric transformations, ordering, and grouping), global objects (how all shape objects are viewed, e.g., viewpoints, lights, backgrounds), behaviors (procedures for modifying information stored in a scene graph), and the like.

The scene graph is object oriented, having software objects that describe the shape objects and software commands that perform the behaviors upon the shape objects. For example, a scene graph can include a software object associated with an aircraft image, and a scene graph display command can operate on the aircraft object to render the aircraft image on a graphical display.

The objects of a scene graph are created using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs." The scene graph data structure described above underlies the tree structure representation.

As used herein, the term "scene graph" is used to describe the underlying data structure associated with a scene graph, as opposed to the set of scene graph display commands or the scene graph tree structure.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programmer interfaces (APIs) have been established to create a scene graph when presented with the scene graph display commands. For example Java3D and VRML provide high-level software to generate a scene graph. Lower level APIs have also been provided, including Open GL, and Direct 3D.

Scene graph techniques are conventionally used to provide a scene graph associated with three-dimensional images on a graphical display, for example in computer games. To this end, hardware manufacturers have provided three dimensional (3D) graphics circuit boards, having local processing capability on the graphical circuit board, and having the ability to interpret scene graph data and providing a corresponding graphical display on a monitor.

Scene graph programming techniques, in conjunction with the 3D graphic circuit board, provide the ability to rapidly render a 3D image on a graphical display with minimal impact on a central computer processor. Images on the graphical display can also be rapidly updated with one or more display commands, interpreted by an API, and sent to the 3D graphics circuit board.

While existing scene graph APIs provide three-dimensional (3D) graphical objects and corresponding 3D images on a graphical display, a conventional air traffic control (ATC) display provides two-dimensional (2D) images. Two-dimensional images are conventionally provided without use of scene graphs and without taking advantage of the local processing capability of the 3D graphics circuit board. Instead, 2D images are conventionally generated with APIs that can interpret a very low-level "paint" command. A single paint command is able to render a simple shape, for example a line. Therefore, in order to render more complex shapes on an ATC display, such as aircraft and geographic features, numerous paint commands are conventionally generated, which are then interpreted by a low level API in conjunction with an ATC central processor. Therefore, the conventional ATC display requires substantial processing time provided by the ATC central processor, in order to process the large number of "paint" commands.

However, a 2D scene graph technique suitable for use in an ATC display system is described in U.S. Patent Application entitled "Scene Graph Based Display for Desktop Applications," filed on Jul. 11, 2003, and assigned application Ser. No. 10/617,599,[which is assigned to the assignee of the present invention and incorporated herein by reference. With the 2D scene graph technique, the ATC display images can be associated with two-dimensional (2D) scene graph display commands, which are interpreted by a 2D scene graph API to provide a 2D scene graph. The 2D ATC display can be updated with 2D scene graph display commands.

As used herein, the term "snapshot" or "dynamic snapshot" should be broadly construed to refer to a set of system parameters describing a system "state" at a particular time. In one particular embodiment, the snapshot corresponds to a complete set of all system parameters describing the system state at the particular time. For example, in one particular embodiment, the dynamic snapshot is a snapshot of display commands representative of all images on a graphical display. It should be recognized that, whereas the exemplary dynamic snapshot includes the display commands themselves, the scene graph instead includes scene graph data generated by an API in response to scene graph display commands.

While the present invention is described in terms of scene graphs and scene graph commands below, and in particular in relation to an ATC display using 2D scene graphs, it should be appreciated that the present invention is also applicable to graphical display images using conventional "paint" commands and to systems other than ATC display systems.

Referring now to FIG. 1, a system 10 for asynchronous recording of a system snapshot includes a radar system 12.

The radar system 12 provides radar information to a software agent 14. The radar information can include, for example, range, elevation, and azimuth information associated with one or more aircraft. The radar information can also include, for example, geographic information such as land topology, including mountains and hills.

The software agent 14 interprets the radar information and provides display commands 16. In one particular embodiment, the display commands are scene graph display commands including commands representative of objects and of renderings. A recording proxy 18 forwards the display commands 16 to a real-time ATC display system 20 with no noticeable delay.

A user interface 15 allows a user to provide inputs to the software agent 14, for example as mouse scrolls, mouse clicks, or the like, for example, to scroll, to zoom, and to otherwise interact with images presented on a monitor 26. The user actions are interpreted by the software agent 14 to generate additional display commands 16.

A real-time ATC display system 20 includes a central processing unit (CPU) 23 operating in conjunction with an API 21. The display commands 16 are received by the API 21, which operates upon the commands to generate a scene graph 24 stored within a graphics module 22. In one particular embodiment, the graphics module 22 is a three-dimensional (3D) graphics circuit board having a local processor (not shown) and capable of storing the scene graph 24. The graphics module 22 is coupled to a monitor 26, which provides an ATC display associated with the scene graph 22 and with the display commands 16.

It should be recognized that the system 10 has relatively few display commands using the scene graph techniques. In another embodiment using the "paint" display commands, the system 10 has more display commands. Therefore, the central processing unit (CPU) 23 of the real-time display system 20, spends less time on processing the scene graph display commands 16 than it would in processing "paint" display commands.

The recording proxy 18 also provides the display commands 16 to a dynamic snapshot generator 30 and to a display command interfuse 28. The dynamic snap shot generator 30 captures a system snapshot, i.e., a dynamic snapshot, associated with the real-time display system 20. In so doing, the dynamic snapshot generator 30 captures display commands associated with images presented on the ATC monitor 26 at a particular time. In one particular embodiment, the dynamic snapshot generator 30 captures display commands associated with all such images. In capturing the dynamic snapshot, the recording proxy 18 may append a time stamp to one or more particular display commands. Use of the time stamps will become apparent in association with FIGS. 7 and 8 below. In operation, the dynamic snapshot can be minimized in size using techniques described in conjunction with FIG. 3 below.

For reasons described above, the dynamic snapshot generated by the dynamic snapshot generator 30 is not the same as the scene graph 24. The scene graph 24 contains processed display commands (processed by API 21) and the dynamic snapshot contains unprocessed display commands 16. The display commands included in a particular dynamic snapshot are representative of those objects and renderings appearing as images on the monitor 26 at a particular time.

The recording proxy 18 also provides the display commands 16 to the display command interface 28. The display command interface 28 captures one or more display commands 16 as they are provided by the software agent 14. Generally, the set of commands captured by the display command interface 28 is a relatively small set of display commands, which does not represent an entire dynamic snapshot. Instead, the set of commands captured by the display command interface 28, if presented to the real-time display system 20, would provide an update of one or more existing ATC display images.

A dynamic snapshot 32 provided by the dynamic snapshot generator 30 is stored by a storage device 36. Subsequent dynamic snapshots 32 are stored to the storage device 36 at first predetermined intervals thereafter. A set of display commands 34 provided by the display command interface 28 is also stored to the storage device 36. Subsequent sets of display commands 34 are stored to the storage device 36 at second predetermined intervals thereafter. The stored dynamic snapshots 32 and the stored sets of display commands 34 are herein referred to as "stored data." The sequence of storage to the storage device 36 is described in greater detail in conjunction with FIG. 4 below.

In one particular embodiment, the storage device 36 includes a tape media capable of storing digital data. In another embodiment, the storage device 36 is a solid-state storage device, for example a non-volatile solid-state storage device.

It should be appreciated that the dynamic snapshot generator 30 can provide the dynamic snapshot 32 to the storage device asynchronously from display activities of the real-time display system 20. It should also be appreciated that the display command interface 28 can provide the sets of display commands 34 to the storage device 36 asynchronously from the display activities of the real-time display system 20. Once recorded, the dynamic snapshots 32 and the sets of display commands 34 contain information necessary to later reconstruct images earlier seen on the monitor 26.

Upon playback, the recorded sets of display commands 38 are provided to a display command interface 42. Also, the recorded dynamic snapshots 40 are provided to a dynamic snapshot generator 44. During playback, in one embodiment, the dynamic snapshot generator 44 can provide a dynamic snapshot that is minimized in size as described below in conjunction with FIG. 3.

Figure 7:
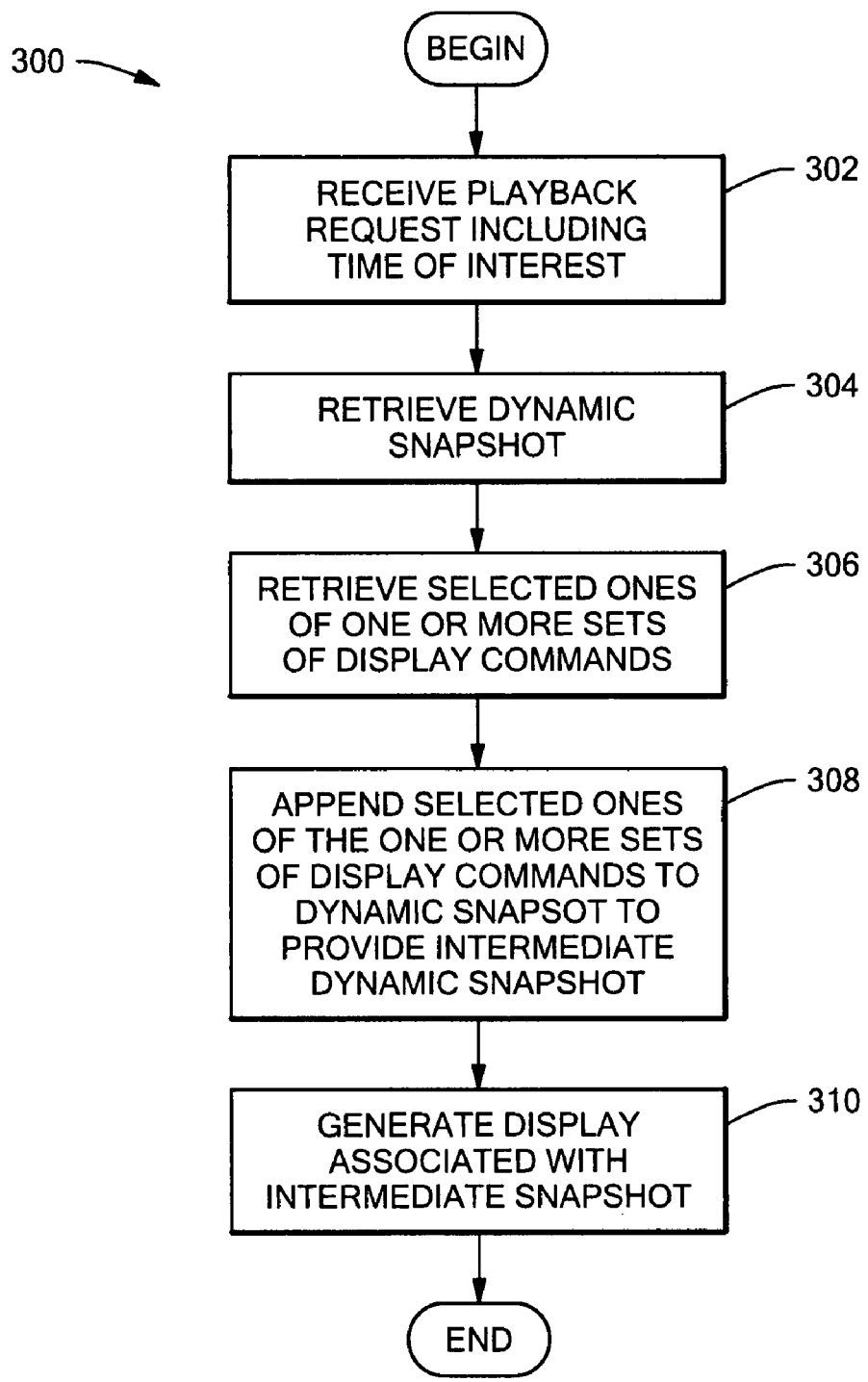
FIG. 7 is a flow diagram illustrating a set of processing steps used to provide a playback of stored dynamic snapshots and stored intermediate sets of commands.
Figure 8:
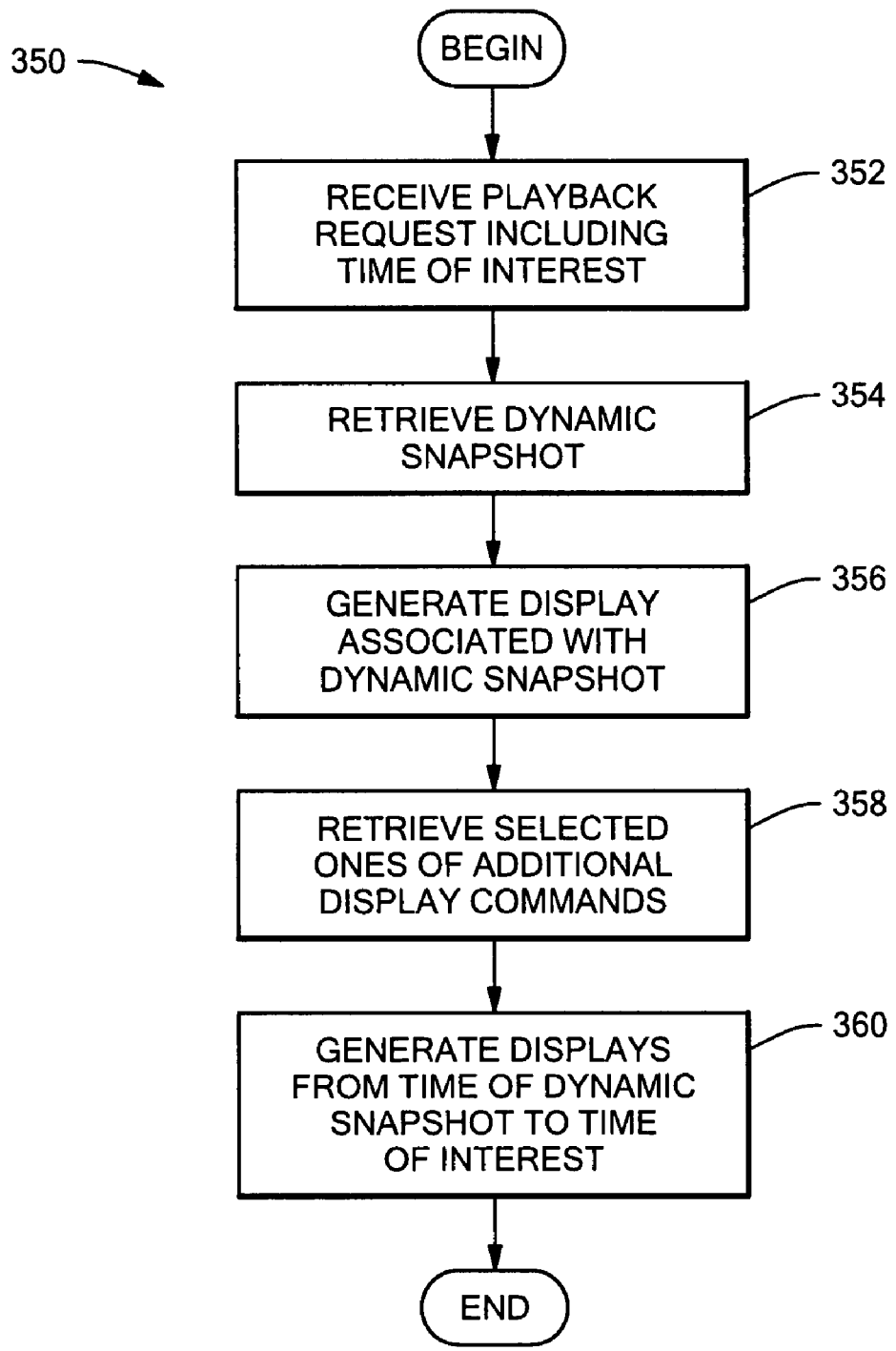
FIG. 8 is a flow diagram illustrating an alternate set of processing steps used to provide a playback of stored dynamic snapshots and stored intermediate sets of commands.

Two types of playback of the recorded data are described in conjunction with FIGS. 7 and 8 respectively. Let it suffice here to say that a recorded dynamic snapshot 48 and one or more recorded sets of display commands 46 are provided to a playback ATC display system 50 having an API 51 associated with a CPU 53, a graphics module 54, and a monitor 56. Upon playback, the dynamic snapshot provided by the dynamic snapshot generator 48, when interpreted by the API 51, provides a scene graph 54. The scene graph 54 is interpreted by the graphics module 52 to provide corresponding images on the monitor 56, which, in one embodiment (e.g., FIG. 7), can correspond to a time of interest. However, in another embodiment (e.g., FIG. 8), the scene graph 54 can be associated with a time before the time of interest and the sets of display commands 46 can bring the scene graph 54 forward in time to the time of interest.

It should be understood that the images thus presented on the monitor 56 correspond to those images seen at the earlier time of interest on the monitor 26, part of the real-time display system 26. Therefore, a user can view what was displayed earlier.

In operation, the display commands 16 received by the graphics module 22, provide the scene graph 24 as well as updates to the scene graph 24. As described above, a scene graph can be represented by a processed group of display commands and an update to the scene graph can be represented by other processed display commands. For example, an image of a particular aircraft presented on the monitor 26 can correspond to one or more processed display commands that invoke an aircraft geometric object from the scene graph 22. Also, a change of characteristics of the particular aircraft, for example position, can correspond to one or more other processed display commands that change the invocation of the aircraft geometric object from the scene graph 22, while other geometric objects presented as images on the monitor 26 remain unchanged.

Figure 2:
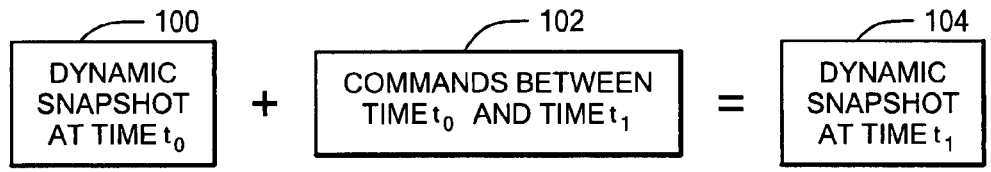
FIG. 2 is a diagram illustrating formation of a dynamic snapshot.

Referring now to FIG. 2, a first dynamic snapshot 100 is obtained at time $t_0$. The first dynamic snapshot 100 is combined with commands 102 recorded between time $t_0$ and some later time designated $t_1$ to provide a second dynamic snapshot 104 associated with the time $t_1$. The second dynamic snapshot 104 includes display commands associated with the time $t_1$, and therefore contains information about the state of images on the monitor 26 at the time $t_1$.

Using the inventive scene graph technique, a snapshot of the ATC display system can be represented using relatively few commands. The relatively few commands, however, correspond to images on the ATC display at a particular time. It is possible to "move" the dynamic snapshot forward through time by adding display commands, without affecting the operation of the system 10 (FIG. 1) in a substantive way.

It should be appreciated that retrieving a dynamic snapshot from the storage device 36 (FIG. 1) is an iterative process. That is, the process of retrieving the dynamic snapshot begins from a "known" system state, which is associated with a particular dynamic snapshot. The dynamic snapshot is then moved forward in time to a time of interest by adding subsequent recorded display commands to the dynamic snapshot.

Figure 3:
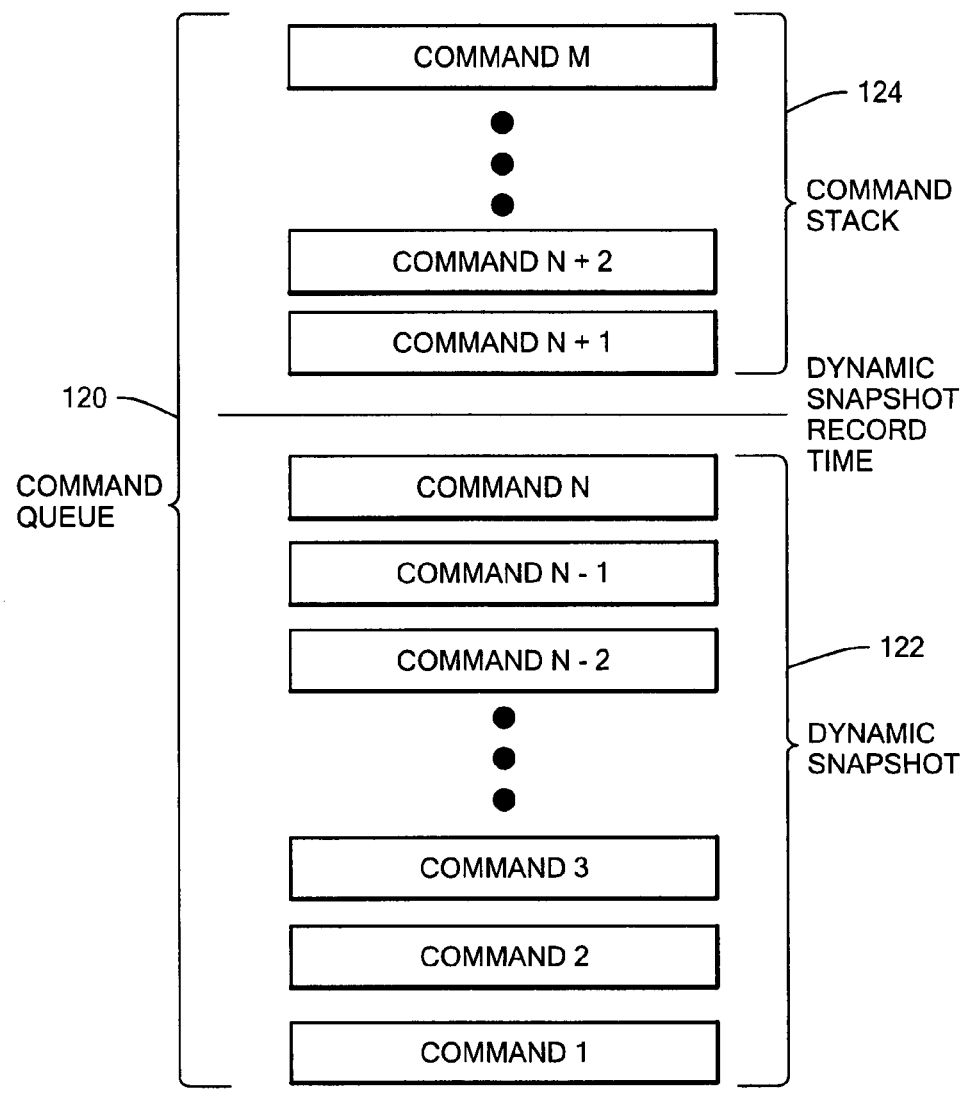
FIG. 3 is a block diagram of a dynamic snapshot command queue.

Referring now to FIG. 3, an exemplary command queue 120 is contained in the dynamic snapshot generators 30, 44 (FIG. 1). The command queue 120 includes a dynamic snapshot portion 122 and a command accumulation portion, also referred to as a command stack 124. Once a recording of a particular dynamic snapshot 122 begins, commands issued after that time are accumulated in the command stack 124 until the recording is completed, and until the time that a next dynamic snapshot is recorded.

Shortly before the time that the next dynamic snapshot is stored in the storage device 36 (FIG. 1) the dynamic snapshot 122 is updated to a state then corresponding to the ATC display system 20 (FIG. 1). The dynamic snapshot is updated by appending the command stack 124 to the dynamic snapshot 122, to become the next dynamic snapshot. It should be understood that, without further processing, the dynamic snapshot 122 would progressively grow in size. Therefore, overridden, redundant, and/or superfluous commands can be removed from the command queue 120 to provide a dynamic snapshot 122 that is reduced in size.

It is understood that in general, an overriding display command is a display command that reverses an action of an earlier issued overridden display command. A redundant display command is a display command that provides the same function as earlier issued display command. A superfluous display command is a display command that has no function in a given context. The removal of the overridden, redundant, and/or superfluous commands is also described in conjunction with FIG. 6.

In one embodiment, the system determines if any (and which) display commands within the command stack 124 override display commands within the dynamic snapshot 122. The overridden commands are removed from the dynamic snapshot 122 and from the command stack 124.

In order to remove overridden display commands, in one embodiment, display commands are translated or broken down into new sequences of display commands. The following show various examples of commands, which are broken down into new sequences.

The following are examples of two display commands:

| | |
|---|---|
| group.add(index, element) | // Inserts the specified element at the<br>// specified position in the group.<br>// Shifts the elements currently at that<br>// position (if any) and any subsequent<br>// element to the right (adds one to<br>// their indices). |
| group.remove(index) | // Removes the element at the specified<br>// position in this group. Shifts any<br>// subsequent element to the left<br>// (subtracts one from their indices). |

It is not easy to determine if a remove display command overrides an add display command. Indeed, between add and remove display commands, other "insertions" and/or "removals" may have been performed and the elements could have shifted. Several options can resolve this uncertainty.

A first option converts "add" and "remove" display commands to sequences of "set" commands, e.g., group.set (element, index) display commands. For example:

```
group:     | A | B | C | D |null|null|      group:  | A | B | C | D |null|null|
             0   1   2   3   4    5                    0   1   2   3   4    5 group.add(1, E):  group.set(4, D)    group.remove(1):  group.set(1, C)
                  group.set(3, C)                      group.set(2, D)
                  group.set(2, B)                      group.set(3, null)
                  group.set(1, E)

group:     | A | E | B | C | D |null|      group:  | A | C | D |null|null|null|
             0   1   2   3   4    5                    0   1   2   3   4    5
```

With this particular option, two "set" commands override each other if and only if they are performed on the same group having the same index.

A second option breaks down the group into group nodes (linked list) and replaces add and remove commands with sequences of createGroupNode( ), groupNode.setNext (groupNode), groupNode.setElement(element) and groupNode.dispose( ) commands. For example:

```
group:     | A | B | C | D |            group:  | A | B | C | D |
             0   1   2   3                        0   1   2   3 group.add(1, E):  n := createGroupNode( )   group.remove(1):  0.setNext(2)
                  n.setNext(1)                                1.dispose( )
                  n.setElement(E)
                  0.setNext(n)

group:     | A | E | B | C | D |            group:  | A | C | D |
             0   n   1   2   3                        0   2   3
```

The second option is usually faster than the first option described above during recording but requires more processing than the first option during playback (to recreate the group from the group nodes).

In one particular embodiment, for each new command applied to the command stack 124, the command queue 120 is examined in order to remove not only the overridden commands, but also redundant and superfluous display commands. The steps performed in order to remove the overridden, redundant, and superfluous display commands are described in conjunction with FIG. 6.

In one embodiment, by removing overridden, redundant, and superfluous commands form the command queue 120, the size of the command queue 120 can be maintained at or near about one hundred kilobytes.

Figure 4:
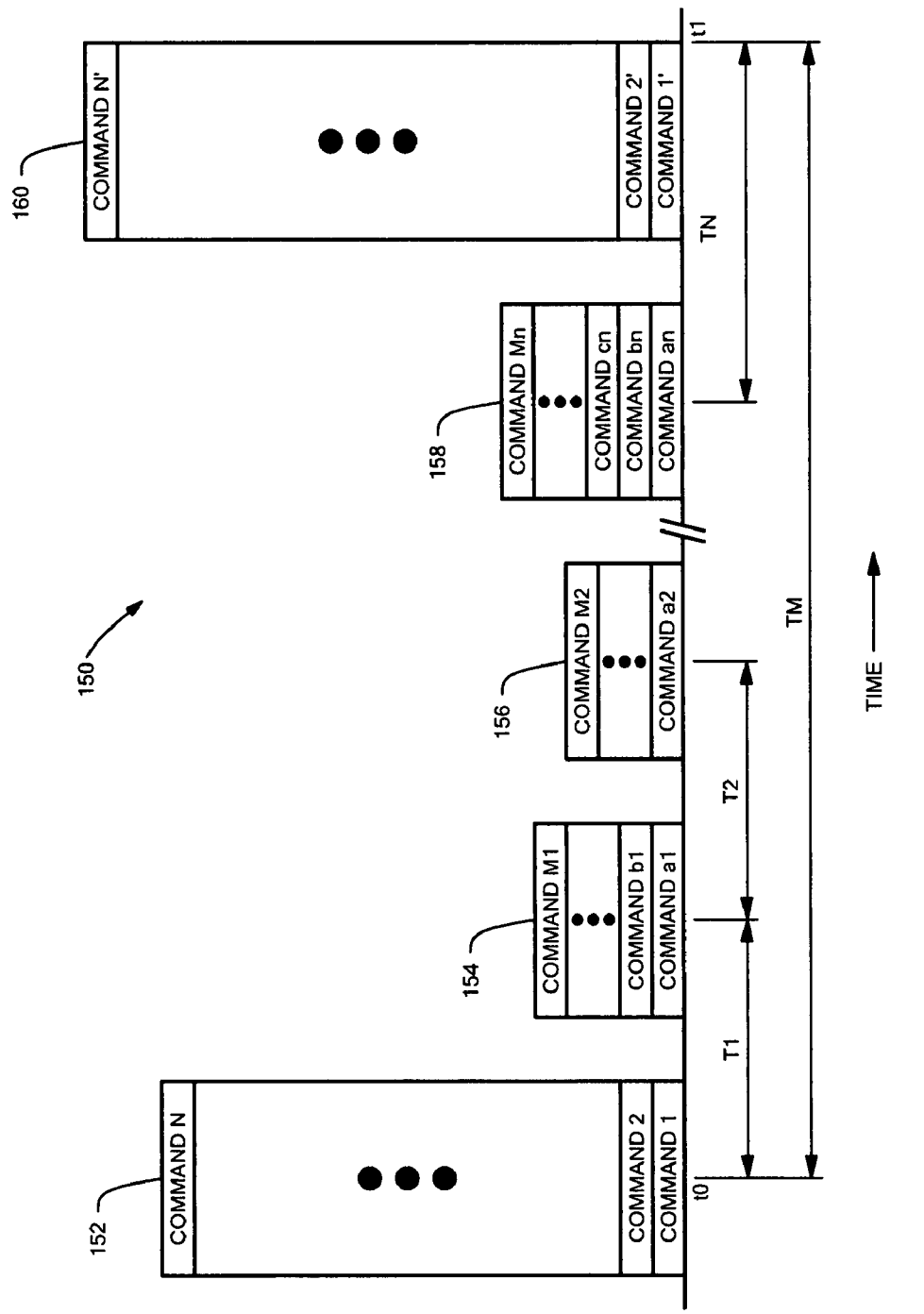
FIG. 4 is a diagram illustrating storage of dynamic snapshots and storage of intermediate sets of commands.

Referring now to FIG. 4, a chart 150 showing storage of display commands includes a time scale 164 having times and time intervals. A first set of display commands 152, corresponding to a dynamic snapshot, is stored at time t0. The dynamic snapshot 152 can correspond, for example, to the dynamic snapshot 122 of FIG. 3 (also 32, FIG. 1) and the storing can be provided, for example, by the storage device 36 of FIG. 1. As described above, the dynamic snapshot 152 includes display commands associated with images on an ATC display at the time t0. There can be any number of display commands in the dynamic snapshot 152.

After a time interval T1, a set of display commands 154 is stored. The set of display commands 154 can correspond, for example, to the set of display commands in the display command interface 28 of FIG. 1, and the storing can be again provided, for example, by the storage device 36 of FIG. 1. The set of display commands 154 can have any number of display commands, however, the set of display commands 154 generally has fewer display commands than the dynamic snapshot 152.

After a further time interval T2, a set of display commands 156 is stored. The set of display commands 156 can correspond, for example, to the another set of display commands in the display command interface 28 of FIG. 1, and the storing can be again provided, for example, by the storage device 36 of FIG. 1. The set of display commands 156 can have any number of display commands, including a different number of display commands than the set of display commands 154. However, the set of display commands 156 generally has fewer display commands than the dynamic snapshot 152.

Other sets of display commands, for example a set of display commands 160, are similarly stored. The time intervals T1, T2 and other time intervals associated with other ones of the sets of display commands, e.g., 154, 156, 158 can be the same time intervals or, in other embodiments, can be different time intervals.

At a time t1, another dynamic snapshot 160 is stored. The dynamic snapshot 160 can correspond, for example, to another of the dynamic snapshots 122 of FIG. 3 (32, FIG. 1) and the storing can be provided, for example, by the storage device 36 of FIG. 1. As described above, the dynamic snapshot 160 includes commands associated with images on an ATC display at the time t1. There can be any number of display commands in the dynamic snapshot 160, and the dynamic snapshot 160 need not have the same number of display commands as the dynamic snapshot 152.

The time interval between the time t1 and the time t0 is a time interval TM, which is larger than any one of the time intervals T1–TN. Therefore, the dynamic snapshots, for example, the dynamic snapshots 152, 160, are stored from time to time and the sets of display commands 156, 158, 160 are stored more often.

It should be appreciated that given the stored dynamic snapshot 152, and given the stored sets of display commands 156, 158, 160, which together form the stored data within the storage device 36 of FIG. 1, during a playback of the stored data, the stored dynamic snapshot 152 can essentially be moved forward in time by appending one of more of the stored sets of display commands 154, 156, 158 to the dynamic snapshot 152 to provide a more recent dynamic snapshot. Also, in one particular embodiment, upon appending the one or more sets of display commands 154, 156, 158 to the dynamic snapshot 152, overridden, redundant, and/or superfluous display commands can be removed from the resulting dynamic snapshot in much the same way as described above for recording in conjunction with FIG. 3.

In one particular embodiment, the time intervals T1, T2, TN are equal in duration and less than one second. In another embodiment, the time intervals T1, T2, TN are equal and less than five seconds. In another embodiment, the time intervals T1, T2, TN are equal and less than sixty seconds. However, in other embodiments, time intervals T1, T2, TN correspond to other times and may or may not be equal.

In one particular embodiment, the time interval TM is equal to time intervals between storage of others of the dynamic snapshots (not shown) and is greater than sixty seconds. In another embodiment, the time interval TM is greater than five minutes. In another embodiment, the time interval TM is greater than ten minutes. However, in other embodiments, time intervals TM corresponds to other times and may or may not be equal to time intervals between recording of other dynamic snapshots.

It should be appreciated that longer intervals between recording of dynamic snapshots results in less recording bandwidth, but a longer seeking time upon playback to find a time of interest. Shorter time intervals, therefore, result in greater recording bandwidth and shorter seeking times.

In one embodiment the techniques of the present invention have been used to demonstrate that: (1) recording does not significantly impact rendering performance (less than 2% of ATC central processor usage) and can be performed by background threads; (2) record/playback bandwidth is relatively low (the sets of display commands 154, 156, 158 represent infrequent changes to the dynamic snapshots, e.g. 152, 160, which are taken, for example, every 5 minutes); and (3) seeking a time of interest during a playback, i.e., to move a dynamic snapshot forward in time, can be relatively fast (less than 1 second for up to 5 minutes of time movement).

FIGS. 5–8 show process steps used to record and playback dynamic snapshots and sets of display commands, for example the dynamic snapshots 152, 160 and the sets of display commands 154, 156, 160 of FIG. 4.

Rectangular blocks of FIGS. 5–8 correspond to software processing steps associated with a software command or a set of software commands, and diamond blocks represent software decisions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 5:
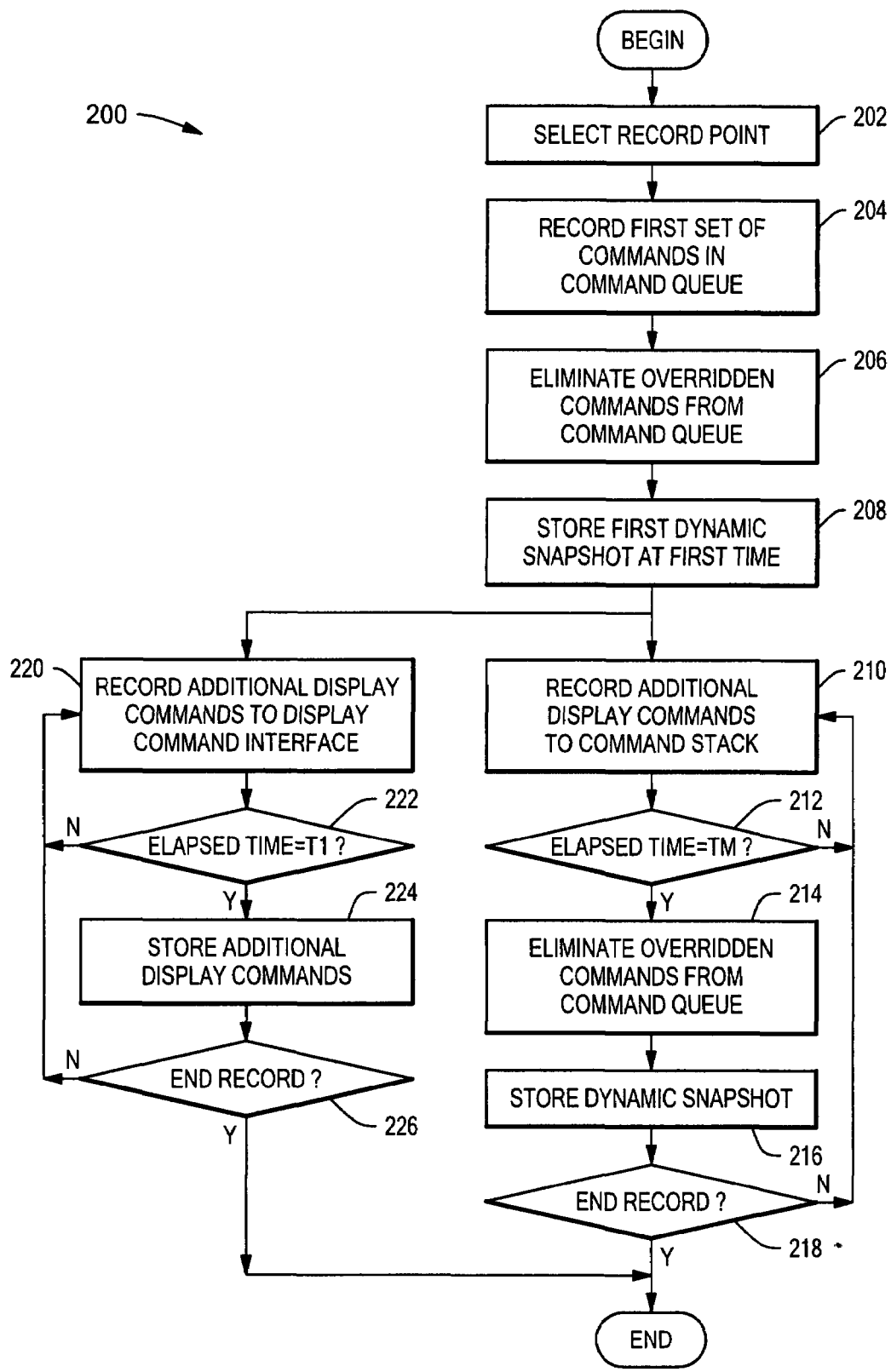
FIG. 5 is a flow diagram illustrating a set of processing steps to generate and to store a dynamic snapshot.

Referring now to FIG. 5, a flow chart 200 represents a series of steps used to record the dynamic snapshots 152, 160 and the sets of display commands 154, 156, 160 of FIG. 4. Processing begins at step 202, at which a point in time is selected at which recording will begin (referred to as a record point). The record point is typically associated with a recorded time stamp. The record point is a point at which at least a set of display commands corresponding to a dynamic snapshot has been acquired in the command queue, for example, the command queue 120 of FIG. 3.

At step 204, a first set of display commands is acquired and temporarily recorded in a solid-state memory or the like. The first set of display commands, as described above, corresponds to at least a set of display commands corresponding to a dynamic snapshot.

Overridden commands are eliminated at step 206 from the command queue, for example the command queue 120 of FIG. 3, after which the process continues to step 208, where the first dynamic snapshot is stored, for example to the storage device 36 of FIG. 1. In an alternate embodiment, redundant and/or superfluous commands are also removed at step 202 (see FIG. 6). As this is the first dynamic snapshot, there may be no overridden, redundant, or superfluous commands in the command queue. At step 208, the dynamic snapshot then stored is not deleted from the command queue 120.

Additional display commands are acquired and recorded to the command stack at step 210, for example, to the command stack 124 of FIG. 3. It will be appreciated that some of the additional display commands can be recorded in the command stack during the time that the dynamic snapshot is being stored to the storage device at step 208. Therefore, the storage of the dynamic snapshot can be performed asynchronously from the acquisition of additional display commands at step 210. Furthermore, the storage of the dynamic snapshot at step 208 can occur asynchronously from other aspects of the display processing.

At step 212, a decision is made as to whether it is time to store another dynamic snapshot, i.e., whether a time interval TM has elapsed since storage of the last dynamic snapshot. Time intervals associated with storage of the dynamic snapshot are discussed above in conjunction with FIG. 4. When enough time has elapsed, the process proceeds to step 214.

Overridden commands are eliminated from the command queue at step 214. As described in conjunction with FIG. 3, the overridden commands can be eliminated, for example, from among the command stack 124 and the dynamic snapshot 122, to generate a new dynamic snapshot. In an alternate embodiment, redundant and/or superfluous commands are also removed at step 214 (see FIG. 6).

At step 216, the new dynamic snapshot is stored to the storage device 36 (FIG. 1), after which, at step 218, a decision is made as to whether a total storage time has elapsed. A total storage time can be associated with, for example, a full storage device 36. If the total storage time has not elapsed, then the process returns to step 210, where additional display commands are accumulated to provide and store yet another dynamic snapshot at step 216.

At step 220, the additional display commands are also acquired, i.e., recorded in a display command interface, for example, the display command interface 28 of FIG. 1.

A decision is made at step 222 as to whether it is time to store the additional display commands, i.e., whether a time interval T1 has elapsed. Time intervals associated with storage of the additional display commands are discussed above in conjunction with FIG. 4. When enough time has elapsed, the process proceeds to step 224, at which time the additional display commands, for example, those additional display commands accumulated in the display command interface 28 (FIG. 1), are stored in the storage device 36. Upon storage of the additional display commands at step 224, the additional display commands can be deleted from the display command interface 28.

Like the dynamic snapshots stored at steps 208, 216, it will be appreciated that some of the additional display commands can be recorded at step 220 in the display command interface 28 during the time that the additional display commands are being stored to the storage device at step 224. Therefore, the storage of the additional display commands can be performed asynchronously from the acquisition of additional display commands at step 220. Furthermore, the storage of the additional display commands at step 224 can occur asynchronously from other aspects of the display processing.

At step 226, a decision is made comparable to the decision of step 218 described above, where it is determined whether the recording should be terminated. If the recording is not terminated, the process returns to step 220, where the earlier additional display commands are erased and new additional display commands are recorded.

With the process 200, the dynamic snapshots are stored at steps 208 and 216 with a time interval TM, while the additional display commands are stored at step 224 with a time interval T1. Generally the time interval T1 is less than the time interval TM. In other words, the dynamic snapshots are stored with longer time intervals between dynamic snapshots and the additional display commands are stored with shorter time intervals between sets of the additional display commands. In an alternate embodiment, the time interval T1 and/or TM can be varied at each cycle beginning at the decisions 226, 228 respectively.

Figure 6:
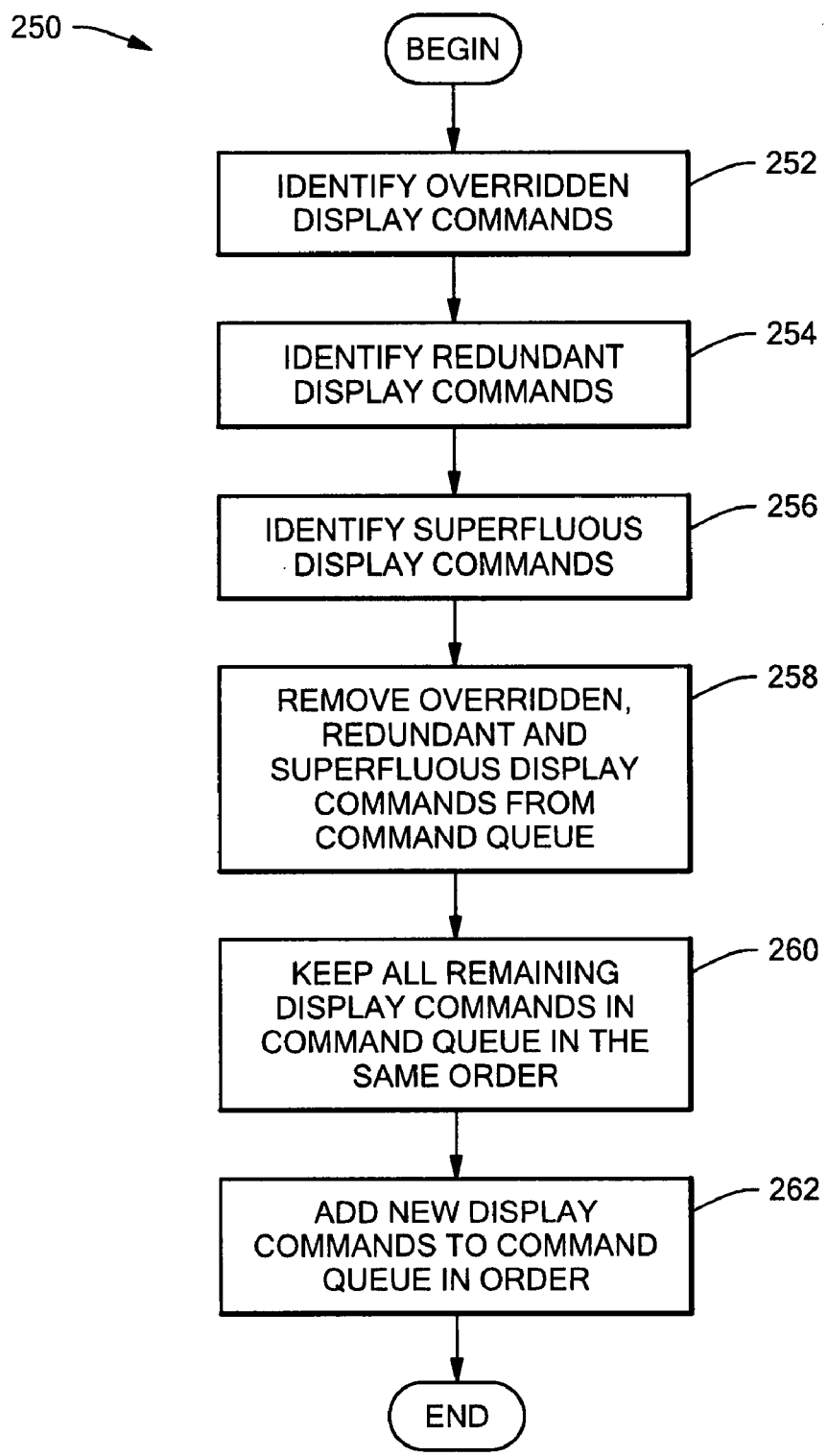
FIG. 6 is a flow diagram illustrating a set of processing steps to eliminate overridden commands from a dynamic snapshot.

Referring now to FIG. 6, a process 250 for removing overridden, redundant, and/or superfluous display commands from the command queue (120, FIG. 3) begins at step 252 by identifying overridden commands. An overriding display command is essentially a display command that reverses or overrides an overridden display command in the command queue that was earlier issued. For example, an earlier issued command can move an image of an aircraft to the right, and an overriding command later issued can move the image of the aircraft to the left by an equal amount. Overridden commands are also discussed in conjunction with FIG. 3 above.

At step 254, redundant display commands in the command queue 120 are identified. A redundant display command is a display command that accomplishes no additional function in view of an earlier issued display command in the command queue 120. For example, an earlier issued display command can specify that the color of an aircraft image is red, and a redundant command later issued can again specify that the image of the aircraft is red.

Superfluous display commands in the command queue are identified at step 256. A superfluous display command is a display command that is not valid in the given context. For example, a display command that sets the color of an object and associated display image to white, when a default color associated with the object is white, has no purpose and is superfluous.

In one particular embodiment, the search for overridden, redundant, and/or superfluous display commands is accelerated by using hash tables (e.g., only commands acting on the same object can be overridden or redundant display commands).

At step 258, the overridden, redundant, and/or superfluous display commands are removed from the command queue 120. In this way, the command queue 120 is minimized in size. In one air traffic control system, the command queue size stabilizes at about 100 kilobytes (kB).

At step 260, the display commands remaining in the command queue 120 are kept in their original order. At step 262, it is indicated that new display commands received in the command queue are also kept in order of reception.

Referring now to FIG. 7, an exemplary playback process 300 includes receiving, at step 302, a request to play back an ATC display associated with a specified time of interest. For an ATC system, for example, the request can be to display what happened at a specific time (e.g. "show what happened at 12:03:00.").

Once the request is received, the system locates on the storage device (36, FIG. 1) a dynamic snapshot having a time stamp prior to the time of interest, and retrieves the dynamic snapshot at step 304. As described above, the dynamic snapshot corresponds to a set of display commands respective of the state of images on the monitor 26 (FIG. 1), corresponding to the time prior to the time of interest. The time stamp preferably corresponds to the closest earlier time at which a dynamic snapshot was recorded, prior to the time of interest. Continuing with the above example, assuming that a dynamic snapshot is stored in the storage device 36 every five (5) minutes beginning on the hour, then the desired dynamic snapshot is the dynamic snapshot stored at 12:00:00, having a corresponding time stamp.

At step 306, additional display commands are retrieved from the storage device 36. As described above in conjunction with FIG. 3, the additional display commands 154, 156, 158 are stored to the storage device between storage of successive dynamic snapshots 152, 160. The retrieved additional display commands, having time stamps, represent a group of display commands that occurred from the time of dynamic snapshot retrieved at step 304 up until the time of interest identified at step 302.

It should be appreciated that the dynamic snapshot retrieved at step 304, in combination with the additional display commands retrieved at step 306, represent the state of the real-time ATC display system 20 at the time of interest. Therefore, the dynamic snapshot retrieved at step 304, in combination with the additional display commands retrieved at step 306, corresponds to an intermediate dynamic snapshot, which corresponds to the dynamic snapshot retrieved at step 304 moved forward in time, as described in conjunction with FIG. 2.

In one particular embodiment, it is also possible to reduce the number of display commands from among the retrieved dynamic snapshot and the retrieved additional display commands to remove overridden, redundant, and/or superfluous display commands in much the same way as described above for recording in conjunction with FIG. 6.

At step 310, a display representative of the time of interest and corresponding to the intermediate dynamic snapshot is generated on the playback ATC display system 50 (FIG. 1). In another embodiment, the display representative of the time of interest is generated instead, or additionally, on the real-time ATC display system 20 (FIG. 1).

The exemplary playback method 300 of FIG. 7 essentially moves the dynamic snapshot forward in time and thus has an advantage of eliminating the need to play through data from the time of the retrieved dynamic snapshot to the time of interest. Instead, a display corresponding to the time of interest is provided.

It should be appreciated that the playback described by the method 300 can be asynchronous from other aspects of the system 10 (FIG. 1). For example, the playback can be provided without impacting the real-time ATC display system 20 (FIG. 1).

Referring now to FIG. 8, an alternate exemplary playback process 350 includes receiving at step 352 a request to play back an ATC display associated with a specified time of interest. For an ATC system, for example, the request can be to display what happened at a specific time (e.g. "show what happened at 12:03:00.").

Once the request is received, the system locates on the storage device (36, FIG. 1) a dynamic snapshot having a time stamp prior to the time of interest, and retrieves the dynamic snapshot at step 354. As described above, the dynamic snapshot corresponds to a set of the display commands corresponding to state of images on the monitor 26 at a time prior to the time of interest. The time stamp preferably corresponds to the closest earlier time at which a dynamic snapshot was recorded prior to the time of interest. Continuing with the above example, assuming that a dynamic snapshot is stored in the storage device 36 every five (5) minutes beginning on the hour, then the desired dynamic snapshot is the dynamic snapshot stored at 12:00:00, having a corresponding time stamp.

At step 356 a display associated with the dynamic snapshot retrieved at step 354 is generated, for example, on the playback ATC display system 50 of FIG. 1. It should be appreciated that the display thus generated does not correspond to the time of interest provided at step 352. In another embodiment, the display associated with the dynamic snapshot retrieved at step 354 is generated instead, or additionally, on the real-time ATC display system 20.

In order to move the display generated at step 356 forward in time, additional display commands are retrieved from the storage device 36 at step 358. The retrieved additional display commands correspond to those stored additional commands that correspond to times between the time of associated with the dynamic snapshot retrieved at step 354 and the time of interest.

At step 360, the display generated at step 356 is played forward in time by applying the retrieved additional display commands. The display can be played forward either at a speed representing normal time progression, at a speed representing fast time progression, or a speed representing slow time progression.

Unlike the playback method of FIG. 7, the exemplary playback method of FIG. 8 allows a user to view a generated display corresponding to any time between the time associated with the dynamic snapshot retrieved at step 354 and the time of interest. In another embodiment, the user can also view a generated display corresponding to a time after the time of interest.

It should be appreciated that the playback described by the method 350 can be asynchronous from other aspects of the system 10 (FIG. 1). For example, the playback can be provided without impacting the real-time ATC display system 20 (FIG. 1).

While the asynchronous storage and playback of a system snapshot has been shown and described in association with 2D scene graph display commands and with an ATC display, it should be appreciated, that in other embodiments, the display commands can include, but are not limited to, 3D scene graph display commands, and conventional "paint" display commands associated with other types of graphical displays, or any combination of 2D, 3D and "paint" display commands.

Also, while the playback method of FIGS. 7 and 8 has been shown and described to be a playback occurring some time later than the generation of a corresponding real-time display, it should be understood that the playback can occur with only a very short time between the playback and the actual real-time display. In this way, the asynchronous storage and playback capability can be used to provide a system snapshot that user can view almost at the same time as the real-time display, without impacting the real-time system operation.

It should be appreciated that the "dynamic snapshot" storage and playback technique of the present invention finds application in a number of different systems but is particularly well suited for object-oriented systems. However, any system that provides software commands or instructions, having overridden, redundant, or superfluous commands or instructions as described above, and for which such overridden, redundant, or superfluous commands can be eliminated so as to limit the size of a dynamic snapshot, is suitable for the above-described techniques. For example, the above-described techniques can also be applied to a database system. It will be recognized that a database software application has software commands, which are suitable for removing overridden, redundant, and superfluous commands in much the same way as described above in conjunction with FIGS. 3 and 6. For example, a "set" command, used to place a number at a memory location can be overridden at a later time by another "set" command that places a number at the same location. Therefore, the techniques of the present invention can provide storage of dynamic snapshots and playback of the system states in much the same was as described above.

The "dynamic snapshot" technique has a number of advantages including but not limited to the following: (1) there is no need to serialize/de-serialize the objects themselves (only the commands); (2) the default object's state does not need to be recorded; (3) if additional commands are recorded and time-stamped, then it is possible to playback the modification to the system from any dynamic snapshot; and (4) it is possible to seek very quickly by re-creating the dynamic snapshot at any particular time.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer implemented method of storing commands, comprising:
   recording a first set of commands to a command queue to provide a first dynamic snapshot, wherein the first dynamic snapshot corresponds to a set of commands associated with a first system state;
   storing the first dynamic snapshot at a first time;
   recording one or more additional sets of commands to the command queue;
   storing the one or more additional sets of commands, wherein storing a first one of the one or more additional sets of commands is spaced in time from storing a second one of the one or more additional sets of commands by a first storage interval;
   eliminating selected ones of overridden, redundant, or superfluous commands from the command queue to provide a second dynamic snapshot, wherein the second dynamic snapshot corresponds to a set of commands associated with a second system state; and
   storing the second dynamic snapshot at a second time, wherein a difference between the first time and the second time corresponds to a second storage interval.

2. The method of claim 1, wherein the first storage interval is less than one second.

3. The method of claim 1, wherein the first storage interval is less than five seconds.

4. The method of claim 1, wherein the first storage interval is less than sixty seconds.

5. The method of claim 1, wherein the second storage interval is greater than sixty seconds.

6. The method of claim 1, wherein the second storage interval is greater than five minutes.

7. The method of claim 1, wherein the second storage interval is greater than ten minutes.

8. The method of claim 1, wherein the commands include scene graph display commands associated with a graphical display.

9. The method of claim 1, wherein the commands include two-dimensional display commands associated with a scene graph and associated with a graphical display, which commands are adapted for interpretation by a three dimensional (3D) graphics circuit board.

10. The method of claim 1, wherein the commands are associated with an air traffic control (ATC) display.

11. The method of claim 1, wherein the recording the first set of commands and the recording the one or more additional set of commands are adapted to store the first set of commands and the one or more additional sets of commands in an electronic solid-state memory.

12. The method of claim 1, wherein the storing the first and second dynamic snapshots and the storing the one or more additional sets of commands are adapted to store the first and second dynamic snapshots and the one or more additional sets of commands in a non-volatile memory.

13. The method of claim 12, wherein the non-volatile memory comprises at least one of an electronic non-volatile memory and a tape recorder.

14. The method of claim 1, further including:
   receiving a time of interest, wherein the time of interest is between the first time and the second time;
   retrieving the first dynamic snapshot;
   retrieving selected ones of the one or more additional sets of commands, wherein the selected ones of the one or more additional sets of commands include commands recorded at or before the time of interest;
   appending the selected ones of the one or more sets of commands to the first dynamic snapshot to provide an intermediate dynamic snapshot associated with the time of interest; and
   interpreting the commands associated with the intermediate dynamic snapshot.

15. The method of claim 14, further including eliminating selected ones of overridden, redundant, or superfluous commands from within the intermediate dynamic snapshot.

16. The method of claim 14, wherein the commands include display commands associated with a scene graph and associated with a graphical display, which commands are adapted for interpretation by a three dimensional (3D) graphics circuit board, and, wherein the interpreting the commands includes generating the graphical display.

17. The method of claim 14, wherein the commands include two-dimensional display commands associated with a scene graph and associated with a graphical display, which commands are adapted for interpretation by a three dimensional (3D) graphics circuit board, and wherein the interpreting the commands includes generating the graphical display.

18. The method of claim 14, wherein the commands are associated with an air traffic control (ATC) display, wherein the interpreting the commands includes generating the ATC display.

19. The method of claim 1, further including:
   receiving a time of interest, wherein the time of interest is between the first time and the second time;
   retrieving the first dynamic snapshot;
   interpreting the first dynamic snapshot
   retrieving selected ones of the one or more additional sets of commands, wherein the selected ones of the one or more additional sets of commands include commands recorded at or before the time of interest; and interpreting the selected ones of the one or more additional sets of display commands.

20. The method of claim 19, wherein the commands include display commands associated with a scene graph and associated with a graphical display, which commands are adapted for interpretation by a three dimensional (3D) graphics circuit board, wherein the interpreting the first dynamic snapshot includes generating the graphical display, and wherein the interpreting the selected ones of the one or more additional sets of display commands includes updating the graphical display.

21. The method of claim 19, wherein the display commands include two-dimensional display commands associated with a scene graph and associated with a graphical display, which commands are adapted for interpretation by a three dimensional (3D) graphics circuit board, wherein the interpreting the first dynamic snapshot includes generating the graphical display, and wherein the interpreting the selected ones of the one or more additional sets of display commands includes updating the graphical display.

22. The method of claim 20, wherein the commands are associated with an air traffic control (ATC) display, wherein the interpreting the first dynamic snapshot includes generating the ATC display, and wherein the interpreting the selected ones of the one or more additional sets of display commands includes updating the ATC display.

23. A system for storing commands, comprising:
a recording proxy adapted to intercept the commands;
a dynamic snapshot generator coupled to the recording proxy for providing dynamic snapshots, wherein each dynamic snapshot corresponds to a respective set of commands and each set of commands is associated with a system state, wherein the dynamic snapshot generator is adapted to eliminate selected ones of overridden, redundant, or superfluous commands from each one of the command sets;
a command interface coupled to the recording proxy for providing commands;
a storage module coupled to the command interface and to the dynamic snapshot generator, for storing the commands and for storing the dynamic snapshots.

24. The system of claim 23, wherein the commands include display commands associated with a scene graph and associated with a graphical display, which commands are adapted for interpretation by a three dimensional (3D) graphics circuit board.

25. The system of claim 23, wherein the commands include two-dimensional display commands associated with a scene graph and associated with a graphical display, which commands are adapted for interpretation by a three dimensional (3D) graphics circuit board.

26. The system of claim 23, wherein the commands are associated with an air traffic control (ATC) display.

27. The system of claim 23, wherein the dynamic snapshot generator includes:
a command queue having:
a command stack portion for recording commands; and
a dynamic snapshot portion for recording commands associated with a system state, and
a processor adapted to combine the commands in the command queue to eliminate selected ones of overridden, redundant, or superfluous commands in the command queue.

28. The system of claim 27, wherein the storage module is adapted to store commands associated with the command stack portion and to store commands associated with the dynamic snapshot portion.

29. The system of claim 27, wherein the storage module is adapted to provide display commands associated with the command stack portion and the display commands associated with the dynamic snapshot portion for generating a graphical display.

* * * * *

UNITED STATES PATENT AND TRADEMARK OFFICE
CERTIFICATE OF CORRECTION

PATENT NO.        : 7,236,165 B2
APPLICATION NO.   : 10/617603
DATED             : June 26, 2007
INVENTOR(S)       : Dautelle It is certified that error appears in the above-identified patent and that said Letters Patent is hereby corrected as shown below:

Column 3, line 4 delete "embodiment overridden" and replace with --embodiment, overridden--.

Column 3, line 31 delete "result" and replace with --results--.

Column 8, line 39 delete "(FIG. 1) the" and replace with --(FIG. 1), the--.

Column 8, line 52 delete "as earlier" and replace with --as an earlier--.

Column 12, line 3 delete "embodiment the" and replace with --embodiment, the--.

Column 14, line 59 delete "respective" and replace with --representative--.

Column 15, line 63 delete "step 356 a" and replace with --step 356, a--.

Column 16, line 8 delete "of".

Column 16, line 38 delete "has" and replace with --have--.

Column 16, line 45 delete "that user" and replace with --that a user--.

Column 17, line 2 delete "was" and replace with --way--.

Column 17, lines 12-13 delete "invention it" and replace with --invention, it--.

UNITED STATES PATENT AND TRADEMARK OFFICE
CERTIFICATE OF CORRECTION

PATENT NO. : 7,236,165 B2
APPLICATION NO. : 10/617603
DATED : June 26, 2007
INVENTOR(S) : Dautelle It is certified that error appears in the above-identified patent and that said Letters Patent is hereby corrected as shown below:

Column 17, line 25 delete "that that the" and replace with --that the--.

Signed and Sealed this

Twenty Second Day of April, 2008

JON W. DUDAS
*Director of the United States Patent and Trademark Office*